United States Patent [19]

Schaupp et al.

[11] E Re. 31,610

[45] Reissued Jun. 26, 1984

[54] MODIFYING MORTARS OF INORGANIC BINDING AGENTS WITH ALKYLATED SULPHONATED PHENOL-FORMALDEHYDE CONDENSATION PRODUCT

[75] Inventors: Kurt Schaupp; Gunther Reitz, both of Cologne; Günther Boehmke, Leverkusen, all of Fed. Rep. of Germany

[73] Assignee: Bayer Aktiengesellschaft, Leverkusen, Fed. Rep. of Germany

[21] Appl. No.: 424,682

[22] Filed: Sep. 27, 1982

Related U.S. Patent Documents

Reissue of:

[64] Patent No.: 4,330,334
Issued: May 18, 1982
Appl. No.: 175,802
Filed: Aug. 6, 1980

[30] Foreign Application Priority Data

Sep. 4, 1979 [DE] Fed. Rep. of Germany ..... 2935719

[51] Int. Cl.[3] ..... C04B 7/35

[52] U.S. Cl. ..... 106/90; 106/97; 106/109; 106/111; 106/315

[58] Field of Search ..... 106/90, 97, 109, 111, 106/315

[56] References Cited

U.S. PATENT DOCUMENTS

| | | | |
|---|---|---|---|
| 3,065,039 | 11/1962 | Komarck et al. | 8/94.24 |
| 3,108,087 | 10/1963 | Kirkpatrick et al. | 260/44 |
| 3,230,197 | 1/1966 | Adolphson | 260/49 |
| 3,442,859 | 5/1969 | Lipowski et al. | 260/49 |
| 3,667,979 | 7/1972 | Beaulieu | 260/2.2 |
| 3,870,681 | 3/1975 | Falkehag et al. | 260/49 |
| 4,125,410 | 11/1978 | Natsuume | 106/90 |
| 4,238,236 | 12/1980 | Falcoz et al. | 106/90 |
| 4,247,334 | 1/1981 | Falcoz et al. | 106/90 |

*Primary Examiner*—James Poer
*Attorney, Agent, or Firm*—Sprung, Horn, Kramer & Woods

[57] ABSTRACT

In a mortar comprising an inorganic binder, water and a sulphonated phenol condensation product modifier therefor, the improvement wherein said condensation product comprises a formaldehyde condensation product of a phenol wherein at least about 40% of the phenolic OH groups are etherified with an alkylating agent, the condensation product being present in about 0.05 to 5% by weight of the binder. Advantageously the condensation product is of the formula (I)

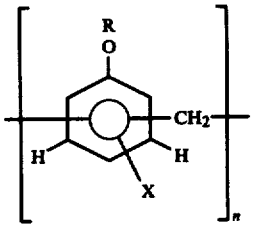

in which

R is H, $C_{1-6}$-alkyl, $C_{1-12}$-aralkyl, $C_{1-4}$-monohydroxy or dihydroxy alkyl, of $C_{3-4}$-hydroxy [chloralkyl] *chloroalkyl*, less than 40% of the R groups being H, X is H, $CH_2$—$SO_3M$, $CH_2OH$, $CH_2$—R′ or $NR'_4$, at least about half the X groups being $CH_2$—$SO_3M$, M is Na, K, Ca/2 or Mg/2, R′ is H, $C_{1-4}$-alkyl, $C_{2-4}$-hydroxy alkyl, or another structural unit of the formula (I)

and n is at least 3.

Thereby the mortar is rendered more plastic and dense while retaining its setting characteristics.

17 Claims, No Drawings

MODIFYING MORTARS OF INORGANIC BINDING AGENTS WITH ALKYLATED SULPHONATED PHENOL-FORMALDEHYDE CONDENSATION PRODUCT

Matter enclosed in heavy brackets [ ] appears in the original patent but forms no part of this reissue specification; matter printed in italics indicates the additions made by reissue.

This invention relates to mortars containing inorganic binders which are modified with alkylated phenol condensates and which may also contain aggregates, admixes and/or additives.

In the production of structural components, such as screeds, wall boards, walls, ceiling etc., inorganic binders, such as anhydrite (natural and synthetic), gypsum or cement, are generally mixed and processed as such, in some cases without leaning, but generally in conjunction with aggregates, such as sand or gravel, optionally using additives, such as air-entraining agents or plasticizers. In order to ensure that the structural components produced with these mixtures have favorable properties, it is important to work with a low water-binder factor (WBF), i.e. with as little water as possible, based on the binder used. In many cases, however, this makes the mortar viscous. If its water content is reduced any further, the mortar loses its plasticity and, hence, its favorable compactibility as well. To be able to produce high quality structural components from a mortar such as this requires intensive mechanical compaction by vibration and/or pressing. Since this is not possible or sufficient for numerous applications, it is often necessary to use increased quantities of binder in order to achieve the required properties, such as high strengths, early hardening or early strippability.

All the measures referred to above involve increased outlay and, hence, increased costs. Excessive quantities of binder can also give rise to technical difficulties. For the reason, the measures in question are frequently not adopted and, instead, easier processability of the mortar is brought about by increasing the WBF. However, structural components produced in this way are not of such high quality.

Accordingly, attempts have been made to improve the processability of mortars by the use of chemical additives. It is known that so-called plasticizers may be used with inorganic binders. Plasticizers of the type in question are generally added to the binder in relatively small quantities. Larger additions produce no significant increase in the plasticizing effect, but instead almost always have a considerable adverse effect upon the properties of the mortar, as reflected above all in a reduction in the setting rate, in an increase in the air void content and in a deterioration in the strength values.

Austrian Pat. No. 263,607 describes the addition of a modified amino-s-triazine resin to inorganic binders. This addition is said to provide the building material with good bond, tensile and compressive strengths and with a high surface quality.

German Offenlegungsschrift No. 2,204,275 describes a phenol-formaldehyde polycondensation product as a plasticizer for mortars or concrete based on mineral binders. This condensation product is nucleus-sulphonated and, in a subsequent reaction, is etherified with polyhydric alcohols through unreacted methylol groups.

German Offenlegungsschrift No. 2,405,437 describes condensation products of formaldehyde with phenol as additives for ceramic compositions and concrete, which products contain sulpho and/or sulphomethyl residues, the acid hydrogen atoms being replaced by sodium, potassium or calcium.

In addition, German Offenlegungsschrift No. 2,421,222 describes a condensation product of formaldehyde with nucleus-sulphonated polyhydric phenols as a plasticizer for binders.

However, the compounds disclosed in the abovementioned publications delay the setting of inorganic binders containing alkaline earth metals, such as cement or calcium sulphate for example, to a very considerable extent. In addition, these compounds which fall within this class and which are directly sulphonated on the nucleus show more or less pronounced surface-active properties, with the result that, in aqueous solution, the product tends to foam and, hence, brings with it the danger of air voids, being introduced into the binder mass which is undesirable, at least so far as most potential applications are concerned.

It has now been found that the disadvantages referred to above do not occur when the phenol group is etherified and the sulpho group is bound to the nucleus directly or, preferably, through a $CH_2$-group.

Accordingly, the present invention provides mortars containing inorganic binders which are modified with alkylated phenol condensation products and which may also contain aggregates, admixes and/or additives, characterized in that the mortars contain partly sulphonated, preferably partly sulphomethylated condensates of phenol or phenol derivatives with formaldehyde in quantities of about 0.05 to 5% by weight, based on the binder used, in which condensates the phenolic OH-group is etherified with about 0.4 to 1.0 equivalents of alkylating agents.

The present invention also provides a process for the production of mortars containing inorganic binders and, optionally, aggregates, admixes and/or additives, characterized in that at least partly sulphonated, preferably sulphomethylated condensates of phenol or phenol derivatives, in which the phenolic OH-group is etherified with from 0.4 to 1.0 equivalents of alkylating agents, are added to the water-setting mortars in quantities of from 0.05 to 5% by weight, based on the binder used.

In the context of the present invention, inorganic binders are understood to be both gypsum having various water contents and in various modified forms (including anhydrite), lime and ceramic masses, and also cement which may be processed both into mortars and also into concrete.

The above-mentioned compounds are at least partly sulphonated, preferably partly sulphomethylated condensates of phenol or phenol derivatives which are partly or completely etherified with alkylating agents on the phenolic hydroxyl group. These condensates are referred to hereinafter as alkylated phenol condensates.

Alkylating agents are alkyl halides, for example methyl chloride, ethyl chloride, benzyl chloride or the corresponding bromides or iodides, and also sulphuric acid esters, such as monomethyl and dimethyl sulphate, p-toluene sulphonic acid esters and phosphoric acid esters such as, for example, trimethyl or triethyl phosphate, formaldehyde and epichlorohydrin. Preferred alkylating agents are alkylene oxides, for example ethylene oxide or 1,2-propylene oxide.

The alkylated phenol condensates preferably contain the following structural elements:

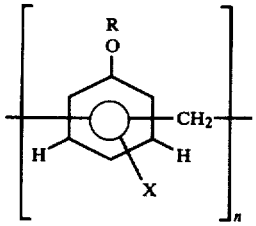

(I)

In this formula, the letters have the following meanings:

R=H, $C_{1-6}$-alkyl, $C_{1-12}$-aralkyl, $D_{1-4}$-monohydroxy or dihydroxy alkyl, $C_{3-4}$-hydroxy chloroalkyl, less than 40% of the groups being H; R is preferably 2-hydroxy alkyl and, with particular preference, 2-hydroxy ethyl. X=H, $CH_2$—$SO_3M$, $CH_2$—OH or $CH_2$—R', where M represents Na, K, Ca/2, Mg/2 $NR'_4$ with R'=H, $C_{1-4}$-alkyl or $C_{2-4}$-hydroxy alkyl, preferably Na, K, Ca/2, Mg/2, or R' represents another structural element (I), no less than half of the groups X being $CH_2$—$SO_3M$;

n=degree of condensation which is at least 3 and preferable at least about 8, normally amounting to about 10 to 200.

The structural elements (I) are middle groups of the alkylated phenol condensates. The terminal groups have basically the same structure, although they may be additionally substituted by H, ($CH_2$—$SO_3M$) or methylol groups. The middle groups (I) are only substituted by methylol groups to a minimal extent.

The alkylated phenol condensates are produced as follows:

Condensates of sulphonated or sulphomethylated phenols or corresponding phenol derivatives with formaldehyde are produced in a first step. The sulphonated compounds are obtained, for example, by reacting phenol or phenol derivatives with $H_2SO_4$, chlorosulphonic acid, oleum or the like. The sulphomethylated compounds are condensates of phenol or phenol derivatives, formaldehyde donors or formaldehyde and sulphites or bisulphites, in which case R in the structural elements (I) is H. These condensates are then reacted with the abovementioned alkylating agents in a second step, preferably carried out in an alkaline medium.

Suitable phenols or phenol derivatives are phenol itself, and also $C_{1-10}$-alkyl phenols, chlorophenols, bisphenols, such as bis-(hydroxyphenyl)-propane, bis-(hydroxyphenyl)-sulphone, o- and p-hydroxy bisphenyl, but preferably phenol. Suitable sulphites are sodium metabisulphite, preferably $Na_2SO_3$, and also mixtures of both. The sulphites may be used as solids or in the form of their aqueous solutions. Preferred alkylating agents are methyl chloride, ethylene oxide, and 1,2-propylene oxide, ethylene oxide being particularly preferred. Another preferred alkylating agent is formaldehyde in the form of a 10 to 40% aqueous solution.

The condensates produced from phenols, formaldehyde and sulphites are then reacted with the alkylating agents, preferably with ethylene oxide, in an aqueous medium at pH about 7 to 13 to form the alkylated phenol condensates containing the structural elements (I). The reaction is carried out to about 20° to 150° C. with about 0.4 to 2 moles, preferably about 0.5 to 1.2 moles and, more particularly, about 0.7 to 1 mole of alkylating agent per mole of the phenolic compound. The alkylating agent reacts preferentially with the phenolic hydroxyl group, which may also be present in the form of a phenolate group, to form the corresponding alkoxy compound. This may be detected, for example analytically through the UV-spectra of the condensates in the alkaline aqueous medium before and after alkylation. Some of the alkylating agent also reacts with the water or hydroxide anion present in the reaction mixture. Accordingly, the degree of etherification is lower than that which corresponds theoretically to the quantity of alkylating agent used. According to the invention, condensates are obtained in which the phenolic OH-group is etherified with from 0.4 to 1.0, preferably with about 0.6 to 0.9 equivalents of alkylating agent per mole of the phenolic compound.

The alkylated phenol condensates thus produced are used in quantities of from 0.05 to 5% by weight, preferably in quantities of about 0.1 to 3% by weight and, with particular preference, in quantities of about 0.2 to 2% by weight, based on the binder used.

The alkylated phenol condensates described above have a very good plasticizing effect but do not adversely affect the setting properties and, in particular, the setting time of the inorganic binders, as is the case with the non-alkylated condensates of phenol with formaldehyde. On the other hand, the mortars or binder sludges according to the invention, to which the products according to the invention are added as plasticizers, do not undergo rapid stiffening. In addition, they have an extremely good deflocculating effect on the binders. This is reflected on the one hand in the "fat", very plastic consistency and, on the other hand, in the very good and stable homogeneity of the concretes and mortars produced therewith.

Surprisingly, the addition of the alkylated phenol condensates according to the invention does not have a surface-active effect which would otherwise be the case with the alkyl ethers or their polymers. An effect such as this would be reflected very clearly in the introduction of a very large number of air voids (cf. Example 4).

By the addition of the alkylated phenol condensates to the inorganic binders, structural components or moldings having very high early strengths are obtained.

An essential feature of the the invention is the etherification of the phenolic OH-group carried out with the alkylating agents, the quantity of the etherification molecules per phenol unit being critical. It has been found that a very good effect is obtained if preferably from 0.5 to 1.2 moles and, more particularly, from 0.7 to 1.0 mole of the alkylating agent is reacted per mole of the phenol compound. Smaller quantities do not sufficiently eliminate the retarding effect, while larger quantities have a surface-active effect and, hence, result in the introduction of air voids during processing of the mortar or concrete and reduce the plasticizing effect. According to the invention, particularly favorable results are obtained if not at all the phenolic OH-groups are etherified, i.e. about 0.2 to 0.4 equivalents of the total quantity are present in non-etherified form.

The products according to the invention are particularly suitable for use in the above-mentioned inorganic binders and, particularly too, in the processing of ceramic compositions. Ceramic slips may be effectively deflocculated with the alkylated phenol condensates. In addition, the deflocculated suspensions show outstanding stability and undergo hardly any sedimentation during the usual storage periods. These results were surprising because similar, non-alkylated compounds, although having a deflocculating effect, give rise to considerable sedimentation, with the result that products of this type cannot be effectively used.

The mortars according to the invention may be processed with the usual, conventional additives, such as retarders, accelerators, anti-foaming agents, foaming agents, sealing compounds, hydrophobizing agents, synthetic resin dispersions and powders thereof, plasticizers, air-entraining agents and fluxes, and with the usual conventional pigments and/or aggregates such as, for example, sand, gravel, chipping, pumice, stone powder, fly ash, perlites, vermiculites, expanded clays, solid, foamed or [exapnded] *expanded* plastics and admixes such as $Fe\text{-}SO_4.7H_2O$, $Al_2(SO_4)_3.18H_2O$, $KAl(SO_4)_2.12H_2O$, etc., either individually or in any combination with one another.

In the process according to the invention for producing the mortars modified with the alkylated phenol condensates, the above-mentioned additives and/or aggregates may be added both to the inorganic binders and also to the aqueous mixture already containing alkylated phenol condensates, although the constituents may also be added in a different order. The plasticizer is preferably added to the mortars mixed with water.

The alkylated phenol condensation products described above may be very widely used where they are employed as plasticizers for inorganic binders (including ceramic compositions) in accordance with the invention. In contrast to other comparable products, the alkylated phenol condensation products may be produced, for example, in the form of very stable, highly concentrated aqueous solutions which, in addition, are still homogeneously liquid at relatively low temperatures. Thus, a 45% aqueous solution is still homogeneous and can be effectively poured and pumped at 0° C., retaining these properties down to −5° C., while comparable products containing free phenolic OH-groups crystallize out at least partly at only 0° C. This behavior is a distinct advantage, particularly during the storage, transportation and processing of the described condensates in relatively cold surroundings, because for example fewer difficulties arise through incorrect dosages, blockages etc. The alkylated phenol condensation products may be used advantageously in the laying of screeds. The mortars or concretes produced with the alkylated phenol condensation products as plasticizers show no tendency towards bleeding or sedimentation and may be homogeneously produced and processed.

The process according to the invention is illustrated by the following examples and tables:

EXAMPLE 1

(Production of Sample A)

376 g of phenol and 36 g of a 45% sodium hydroxide solution were heated together to 80° C., followed by the dropwise addition of 800 g of a 30% formaldehyde solution. After the formaldehyde solution had been added, the mixture was stirred for 10 minutes at 80° to 90° C., after which 1040 g of a 40% $NaHSO_4$ solution were slowly added and the mixture was stirred for 6 hours at a temperature of 140° C. The sample was then diluted to a solids content of 30%.

EXAMPLE 2

(Production of Sample B)

500 g of a sample produced in accordance with Example 1 were reacted for 2 hours at 80° C. with 32.5 g of ethylene oxide in an ethoxylation autoclave.

BUILDING TESTS

The basic mixture used was a concrete of 350 kg of PC 35 F/m³ concrete which has been produced with a watercement factor (WCF) of 0.56 using 0 to 16 mm aggregate. The zero concrete (no additions) had been adjusted to a slump (according to DIN 1164) of 40 cm (after jolting). The increase in slump (also expressed in cm) is based on this value.

The following additives were used:

A = phenol polycondensed with formaldehyde and sulphonated through methylol groups according to example 1, B = same as A, except that 70 to 80% of the phenolic OH groups are etherified with ethylene oxide = product according to the invention, example 2

C = standard commercial flux based on ditolyl ether;

D = standard commercial flux based on amino-s-triazine resin.

The plasticizing effect is reflected in the increase in slump.

TABLE 1

| Mix | WCF | Increase in slump (cm) |
|---|---|---|
| no additions | 0.56 | 0 |
| 0.25% A | 0.56 | 17 |
| 0.25% B | 0.56 | 18 |
| 0.3% C | 0.56 | 16.5 |
| 0.3% D | 0.56 | 14.5 |

The effect of various additions on the setting times was determined on non-leaned samples to demonstrate the results more clearly. The extremely pronounced retarding effect of Sample A is particularly noticeable.

The additions were made to the mixing water. The setting times were determined with a Vicat needle.

TABLE 2

Effect of Fluxes on the Setting Times

| Mix | WBF | Setting Times beginning | / end |
|---|---|---|---|
| (a) Cement (PC 35 F) | | | |
| no addition | 0.275 | 3h 45 mins | 4 h 5 mins. |
| +0.75% A | 0.275 | 14 h 30 mins. | 20 h 25 mins. |
| +0.75% B | 0.275 | 5 h 20 mins. | 7 h 50 mins. |
| (b) anhydrite binder (AB 20) | | | |
| no additions | 0.275 | 4 h 5 mins. | 4 h 55 mins. |
| +0.75% A | 0.275 | sample only dries, does not set. | |
| +0.75% B | 0.275 | 6 h 15 mins. | 7 h 10 mins. |

Table 3 illustrates the satisfactory setting behavior of cement where the product according to the invention is added in contrast to the non-alkylated phenolcondensate A.

The test was carried out as follows:

A thermocurve characterizing the hardening behavior was recorded in a calorimeter with a temperature recorder connected thereto.

Where the setting time is determined by Vicat's method, the false hardening can clearly be seen in the case of the conventional phenol product A, whereas on the other hand the thermocurve shows the true hardening times. By contrast, the product B according to the invention shows normal setting behavior.

TABLE 3

| Sample | Testing of setting behavior of PC 45: Setting Time according to Vicat (mins) beginning/end | Thermocurve beginning/maximum (mins.) |
|---|---|---|
| 0 | 180/275 | 180/380 |
| A | 15/30 | 480/760 |
| B | 290/335 | 240/465 |

[The] Table 4 shows the pronounced retarding effect of the conventional phenol compound A in contrast to product B according to the invention on the basis of the strengths after different times. In addition, this table shows the outstanding plasticizing effect of the product according to the invention on a cement mortar which had been leaned with 0 to 8 mm sand. Another remarkable feature in this case is the strength values which, despite the highly plasticized mortar, show virtually no reduction by comparison with the non-plasticized 0-mortar.

TABLE 4

Zero Sample: PC 35F 1:4 PV* leaned with 0–8 mm sand

| Mix | WBF* | Slump | 18 hours UW* | BTS* | CS* | % | 24 hours BTS | CS | % |
|---|---|---|---|---|---|---|---|---|---|
| zero sample | 0.57 | 10.0/13.5 | 2.30 | 0.98 | 4.15 | 100 | 3.57 | 15.1 | 100 |
| B | " | 10.0/16.5 | 2.33 | 0.85 | 3.92 | 90 | 4.30 | 17.3 | 117 |
| A | " | 10.0/16.0 | 2.34 | 0.31 | 1.15 | 34 | 3.40 | 16.0 | 100 |

| Mix | 3 days BTS | CS | % | 7 days BTS | CS | % | 28 days BTS | CS | % |
|---|---|---|---|---|---|---|---|---|---|
| zero sample | 5.60 | 31.0 | 100 | 6.42 | 37.5 | 100 | 6.71 | 48.4 | 100 |
| B | 5.40 | 30.3 | 97 | 6.50 | 38.3 | 102 | 7.08 | 46.7 | 101 |
| A | 5.17 | 31.6 | 97 | 6.22 | 39.9 | 101 | 7.87 | 49.9 | 110 |

*PV = parts by volume
WBF = water binder factor
UW = unit weight (kg/l)
BTS = bending tension strength } (N/mm²)
CS = compressive strength } (N/mm²)

The positive effect of the product according to the invention was also in evidence where it was used in conjunction with gypsums. Despite very good plasticization, an improvement in the strength values was obtained in this case, too.

TABLE 5

Effect of plasticizers on fluidity, setting time and strength values in the case of gypsum

| Sample | Slump (cm) | Setting time(mins.) beginning | end | Strengths/n/mm² bending tension | compressive |
|---|---|---|---|---|---|
| 0 | 18.5 | 17 | .25 | 6.38 | 19.5 |
| A | 30 | 13 | 21 | 5.07 | 16.8 |
| B | 28 | 6 | 15 | 6.32 | 20.3 |

Aβ-gypsum was used.

EXAMPLE 3

The following tests were carried out to determine the effect of the degree of alkylation on plasticization and setting times:

500 g of a sample produced in accordance with Example 1 were reacted at 80° C. in an ethoxylation autoclave with

| | | |
|---|---|---|
| (a) 16.8 g of ethylene oxide | = 0.43 | mole per mole of phenol |
| (b) 24.2 g of ethylene oxide | = 0.62 | mole per mole of phenol |
| (c) 31.2 g of ethylene oxide | = 0.8 | mole per mole of phenol |
| (d) 38.7 g of ethylene oxide | = 0.99 | mole per mole of phenol |
| (e) 46[,].9 g of ethylene oxide | = 1.2 | mole per mol of phenol |
| (f) g of ethylene oxide | (= 1.54 | mole per mole of phenol |
| (g) 78.2 g of ethylene oxide | = 2.0 | mole per mole of phenol |

The determination of slump, trace time and setting time where the products are used for anhydrite is a very good indicator for the activity test. The relevant data are given in Table 6.

1 kg of anhydrite, 250 g of water and 4 g of the particular sample were intensively mixed, followed by determination of the degree of slump, the trace time (in a dish) and the setting time according to Vicat (in a ring). The trace time is understood to be that period of time which passes before a trace drawn in the mix remains intact.

As can be seen from table 6, products 3c and 3d are particularly suitable.

Identical tests with non-leaned cement give similar results:

TABLE 6

| | Slump cm | Trace time mins. | Setting time hours/mins. |
|---|---|---|---|
| no additions | 20.5 | 0 | 4 h 50′ |
| Example 1 | 42.5 | 200 | infinite |
| Example 3a | 42.5 | 190 | infinite |
| 3b | 41.5 | 180 | approximately 36 h |
| 3c | 41.0 | 100 | 12 h |
| 3d | 38.5 | 45 | 7 h 50′ |
| 3e | 34 | 17 | 7 h 10′ |
| 3f | 28 | 7 | 7 h |
| 3g | 26 | 4 | 6 h 50′ |

A mixture of 1 kg of cement, 300 g of water and, optionally, 5 g of plasticizer produced the following result:

Without the plasticizer, the slump amounted to 10 cm and the setting time to 5 hours. Where the product of Example 1, i.e. not reacted with ethylene oxide, was used the slump increased to 33 cm, but the setting time was too long, i.e. 14 hours. With the product of Example 3g, i.e. after reaction with 2 moles of ethylene oxide per mole of phenol, the slump is very poor at only 11.5 cm, although the setting time is good (4 hours 40 minutes). The products of Example 3c and 3d, i.e. reacted with 0.8 and 0.99 moles, respectively, of ethylene oxide per mole of phenol, are again the most suitable, giving a high slump of 30 cm and a good setting time of 6.5 hours, i.e. only slightly higher than that of the sample without added plasticizer.

EXAMPLE 4

This example demonstrates the outstanding properties of the plasticizers according to the invention in regard to the introduction of air and the resulting undesirable reduction in unit densities.

800 g of cement, 4 kg of sand, 460 g of water and 4 g of the plasticizer indicated below were mixed, and the resulting mixture was introduced into a measuring vessel of granulated volume, briefly compacted and then weighed out. The following densities were measured:

| | Density |
|---|---|
| no addition | 2.261 |
| Example 1 | 2.261 |
| Example 3a | 2.261 |
| 3b | 2.260 |
| 3c | 2.259 |
| 3d | 2.259 |
| 3e | 2.259 |
| 3f | 2.245 |
| 3g | 2.237 |

Up to Example 3e, the unit densities remained substantially unchanged by comparison with the mixture containing no added plasticizer, so that no air was introduced. With larger proportions of reacted oxide (Example 3f and 3g), the unit densities fell distinctly because air was introduced.

It will be appreciated that the instant specification and examples are set forth by way of illustration and not limitation, and that various modifications and changes may be made without departing from the spirit and scope of the present invention.

We claim:

1. In a mortar comprising an inorganic binder, water and a sulphonated phenol condensation product modifier therefor, the improvement wherein said condensation product comprises a formaldehyde condensation product of a phenol wherein [at least about 40%] *about 60% to 90%* of the phenolic OH groups are etherified with an alkylating agent, the condensation product being present in about 0.05 to 5% by weight of the binder.

2. A mortar as claimed in claim 1, wherein the sulphonated phenol condensation product is of the formula

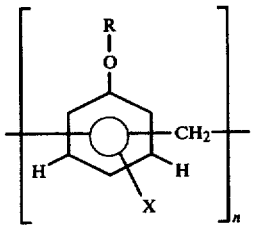

(I)

in which

R is H, $C_{1-6}$-alkyl, $C_{1-12}$-aralkyl, $C_{1-4}$-monohydroxy or dihydroxy alkyl, of $C_{3-4}$-hydroxy chloroalkyl, [less than] *10% to* 40% of the R groups being H, X is H, $CH_2$—$SO_3M$, $CH_2OH$, $CH_2$—R′ or $NR'_4$, at least about half the X groups being $CH_2$—$SO_3M$, M is Na, K, Ca/2 or Mg/2, R′ is H, $C_{1-4}$-alkyl, $C_{2-4}$-hydroxy alkyl, or another structural unit of the formula (I) and n is at least 3.

3. A mortar as claimed in claim 1, wherein the sulphonated phenol condensation product is present in about 0.1 to 3% by weight of the binder.

4. A mortar as claimed in claim 2, wherein n is at least 8.

5. A mortar as claimed in claim 2, wherein the sulphonated phenol condensation product is present in about 0.2 to 2% by weight of the binder, [about 60 to 90% of the phenolic OH groups are etherified,] n is from 10 to 200, and the mortar further contains at least one aggregate selected from the group consisting of sand, gravel, perlite, pumice, foamed plastic and solid plastic.

6. A process for improving the processability of mortar comprising an inorganic binder and water, comprising incorporating therein in about 0.05 to 5% by weight of the binder a sulphonated phenol condensation product of a phenol and formaldehyde wherein [at least about 40%] *about 60% to 90%* of the phenolic OH groups are etherified with an alkylating agent.

7. A process according to claim 6, wherein the sulphonated phenol condensation product is of the formula

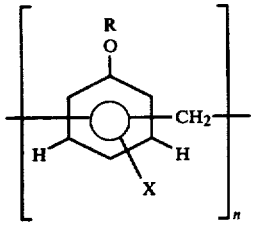

(I)

in which

R is H, $C_{1-6}$-alkyl, $C_{1-12}$-aralkyl, $C_{1-4}$-monohydroxy or dihydroxy alkyl, or $C_{3-4}$-hydroxy chloroalkyl, [less than] *10% to* 40% of the R groups being H, X is H, $CH_2SO_3M$, $CH_2OH$, $CH_2$—R′ or $NR'_4$, at least about half the X groups being $CH_2$-$SO_3M$, M is Na, K, Ca/2 or Mg2, R′ is H, $C_{1-4}$-alkyl, $C_{2-4}$hydroxy alkyl, or another structural unit of the formula (I) and n is at least 3.

8. A process according to claim 6, wherein the sulphonated phenol condensation product is present in about 0.2 to 2% by weight of the binder, [about 60 to 90% of the phenolic OH groups are etherified,] n is from 10 to 200, and the mortar further contains at least one aggregate selected from the group consisting of sand, gravel, perlite, pumice, foamed plastic and solid plastic.

9. A mortar as defined in claim 1, further containing at least one admix selected from the group consisting of $FeSO_4.7H_2O$, $Al_2(SO_4)_3.18H_2O$ and $KAl(SO_4)_2.12H_2O$.

10. A mortar as defined in claim 1, further containing at least one aggregate selected from the group consisting of sand, gravel, perlite, pumice, foamed plastic and solid plastic.

11. A mortar as claimed in claim 1, further containing a plasticizer.

12. A mortar as claimed in claim 1, further containing a hardening accelerator.

13. A mortar as claimed in claim 1, further containing a retarder.

14. A mortar as claimed in claim 1, further containing air-entraining agent.

15. A mortar as claimed in claim 1, further containing a diluent.

16. A mortar as claimed in claim 1, further containing an activator.

17. A mortar as claimed in claim 1, further containing an anti-foam agent.

* * * * *